Jan. 19, 1954  J. SKORECKI  2,666,291
JET PIPE HAVING A DISCHARGE END PORTION
OF VARIABLE CROSS SECTIONAL AREA
Filed Dec. 19, 1950  3 Sheets-Sheet 1

Inventor
J. Skorecki
By Glascock Downing Seubold
Attys.

Jan. 19, 1954  J. SKORECKI  2,666,291
JET PIPE HAVING A DISCHARGE END PORTION
OF VARIABLE CROSS SECTIONAL AREA
Filed Dec. 19, 1950  3 Sheets-Sheet 2
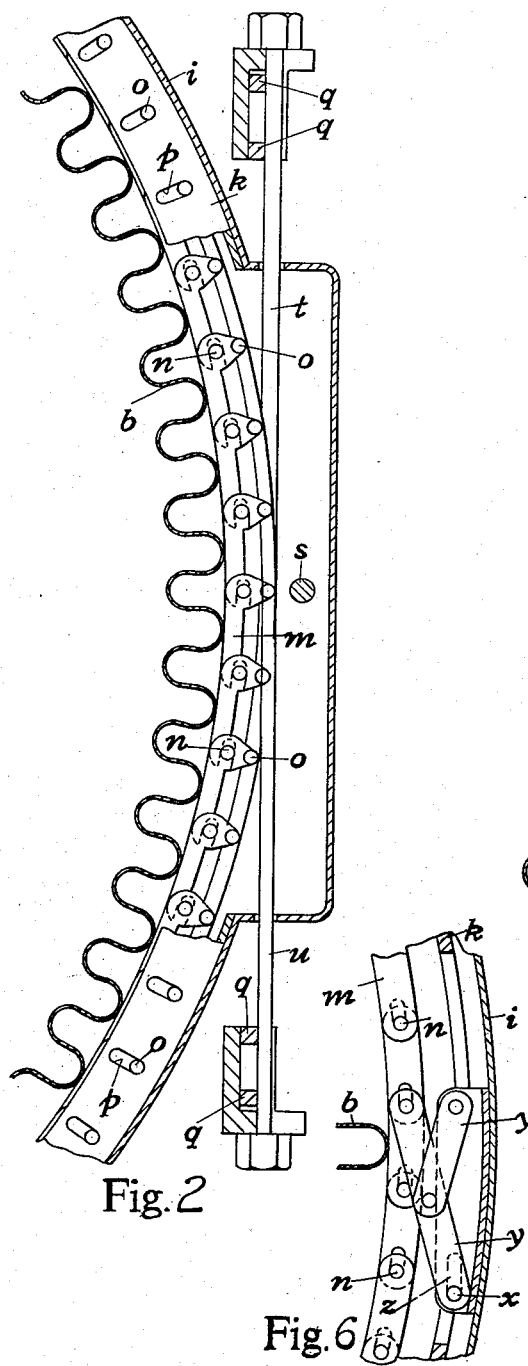
Fig. 2
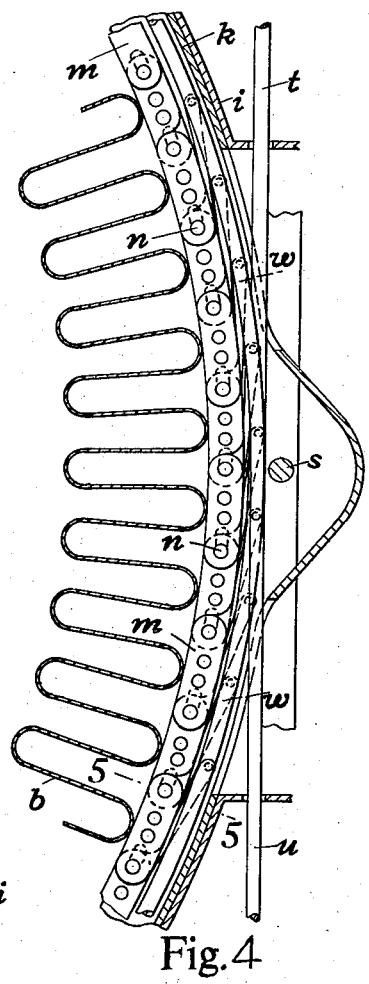
Fig. 4
Fig. 6
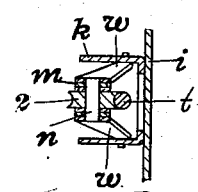
Fig. 5
Inventor
J. Skorecki Patented Jan. 19, 1954

2,666,291

UNITED STATES PATENT OFFICE 2,666,291

**JET PIPE HAVING A DISCHARGE END POR-
TION OF VARIABLE CROSS SECTIONAL
AREA**

Jan Skorecki, Burnley, England, assignor to
Joseph Lucas Limited, Birmingham, England Application December 19, 1950, Serial No. 201,504

4 Claims. (Cl. 60—35.5)

This invention relates to the jet pipes of jet-propulsion engines. The object of the invention is to provide means for exerting pressure on the exterior of a longitudinally corrugated and elastically deformable discharge end portion of a jet tube to reduce the cross sectional area thereof in the vicinity of at least the outer end thereof.

The invention comprises in combination at least one chain of annular form embracing the said end portion, the chain being composed of links having pin-and-slot connections therebetween to render the contractible, a fixed annular housing of trough-like form containing the chain, at least one flexible cable embracing the chain for effecting contraction thereof, and guide means connecting the links to the housing whilst allowing radial movement of the links relatively to the housing.

In the accompanyings drawings—

Figure 1 is a side elevation, and

Figure 2 a fragmentary sectional end view (to a larger scale than Figure 1) showing an embodiment of the invention.

Figure 4 is a similar view to Figure 2 illustrating a modification of the invention, Figure 5 being a cross section on the line 5—5 (Figure 4) and Figure 6 being a fragmentary end view.

Figure 1:
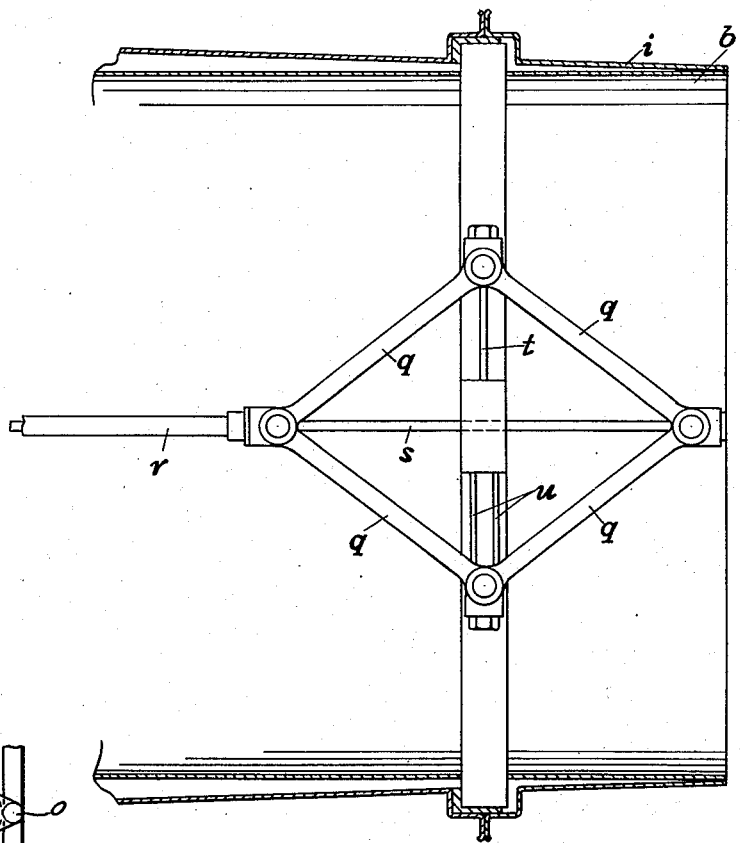

Referring to Figures 1 and 2, $b$ indicates a longitudinally corrugated discharge end piece of a metal jet pipe (not shown). The pitch and depth of the corrugations in the end piece $b$ are such as will impart circumferential flexibility to the part $b$, and so enable the area of the discharge end to be varied within the desired limits.

The part $b$ may be formed integrally with the jet pipe, or it may be constructed as a separate part which can be attached to the end of the jet pipe.

To minimise the effect of heat on the elasticity of the corrugated part $b$, the latter is surrounded by an air jacket $i$.

The invention is especially intended for use on jet pipes in which the effluent gases receive supplementary heat by the combustion of additional liquid fuel therein immediately prior to discharge of the gases. But the invention may be usefully applied to jet pipes generally, where variability of the area of the discharge end is desired.

Figure 3:
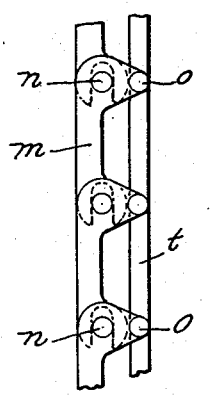
Figure 3 is a fragmentary view illustrating chain and cable parts to a large scale than Figure 2.

Embracing the part $b$ is an annular contractible chain through the medium of which the cross sectional area of the said part can be reduced in the vicinity of at least the outer end thereof, and which is contained in a housing $k$ of channel cross section and arranged within the air jacket $i$. The chain consists as shown in Figures 2 and 3 of a number of links $m$ interconnected by pivot pins $n$. One end of each link is slotted to enable the circumferential length of the chain to be varied, and each pin $n$ passes through a hole in one end of a link and the slot in the end of the associated link. Further each link has secured to one of its ends a pin $o$ which extends laterally from one side of the link into engagement with a radial guide slot $p$ in the housing $k$. A contractible force is exerted on the chain by cables, having their ends secured to actuating means. In this example, and as shown in Figure 1, there is arranged at each of the two opposite sides of the corrugated part $b$ a lazy-tongs mechanism consisting of four pivotally interconnected links $q$. To one opposite pair of joints of the links are respectively connected the sheath $r$ and cable $s$ of a Bowden wire for actuating the links. To one other joint is connected one end of a cable $t$ which passes around one half of the annular chain in the housing $k$, the other end being connected to the coresponding joint of the links $q$ at the opposite side of the corrugated part $b$. Likewise to the other joint of the links $q$ are connected a pair of cables $u$ which pass around the other half of the annular chain. Actuation of the Bowden cable in the appropriate direction causes the cables $t$, $u$ to tighten on the annular chain and so cause the latter to contract the corrugated part $b$. Preferably, two such annular chains are mounted on the part $b$, one near its discharge end and the other near its inner end. Each chain is embraced by cables as $t$, $u$, and the lazy-tongs linkages are adapted to actuate the cables of both chains from the same Bowden wires.

Another construction and arrangement of annular contractible chain and associated cables is shown in Figures 4, 5, 6. In the annular housing $k$ mounted around the corrugated part $b$ is contained the chain which embraces the part $b$. The links $m$ of the chain are each slotted at one end to allow of the required contraction of the chain, and the links are interconnected by pins $n$. Also there is attached to one end of each link $m$ a control link $w$ which at its other end is pivotally attached to the housing $k$, as shown in Figure 4 and in the cross section shown in Figure 5. In addition, the device shown in Figure 6 is provided for securing the chain against creeping. This device comprises a pair of links $y$ one of which is shorter than the other and is pivotally attached at opposite ends respectively to the air jacket $i$ and an intermediate part of the longer link. The latter has one of its ends pivotally connected to one of the chain pins $n$, and the other of its ends connected to an air jacket $i$ by a pin $x$ engaging a slot $z$ in an anchorage on the air jacket. From an inspection of Figure 6 it will be seen that the links $y$ serve to resist creeping movement of the chain since, due to the links, such movement must be accompanied by radial movement relatively to the air jacket of the part of the chain connected to the longer link. The mode of actuation of the chain is effected by cables $t$, $u$ in the manner described with reference to Figures 1 to 3, the cables being supported on the chain by rollers, of which one is shown at 2 in Figure 5.

Figure 7:
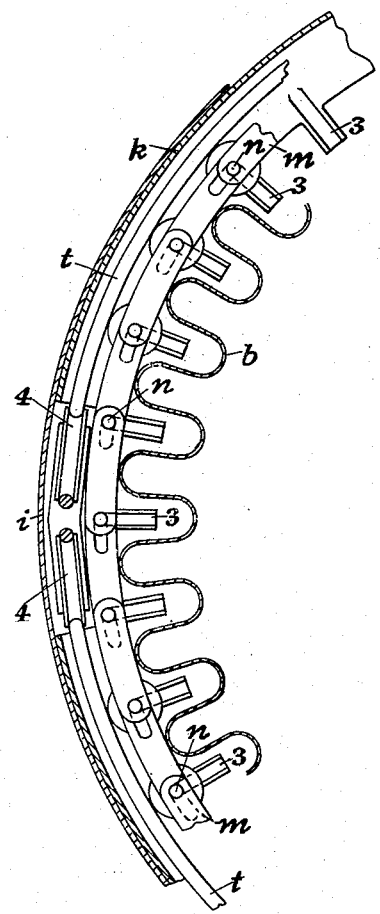
Figures 7 and 8 are respectively a fragmentary sectional end view, and side view of a further modification.
Figure 8:
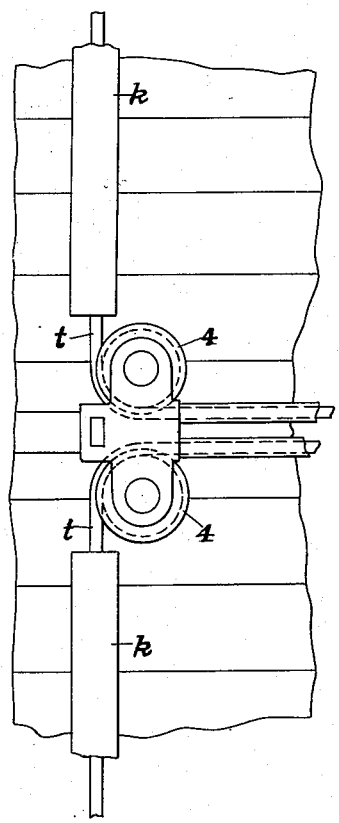

In the further modification shown in Figures 7 and 8, the annular contractible chain consisting of suitably slotted links $m$ interconnected by pins $n$, is contained in a housing $k$ from the inner periphery of the sides of which extend guide pieces 3, these being located in between the corrugations of the part $b$. The guide pieces 3 and the adjacent side portions of the housing are shaped to form radial guides for the projecting ends of chain pins $n$. Around the chain is arranged a cable $t$ which passes between guide rollers 4 and is adapted to contract the chain when a pull is exerted on the cable.

Having thus described my invention what I claim as new and desire to secure by Letters Patent is:

1. Means for exerting pressure on the exterior of a longitudinally corrugated and elastically deformable discharge end portion of a jet tube to reduce the cross sectional area thereof in the vicinity of at least the outer end thereof, comprising in combination at least one chain of annular form for embracing said end portion, said chain being composed of links having pin-and-slot connections therebetween to render said chain contractible, a fixed annular housing of trough-like form containing said chain, at least one flexible cable embracing said chain for effecting contraction thereof, and guide means connecting said links to said housing whilst allowing radial movement of said links relatively to said housing.

2. Means as claimed in claim 1, in which the guide means comprise laterally projecting pins provided on the chain links and engaging radial guide slots in the housing.

3. Means as claimed in claim 1, in which the guide means comprise links interconnecting the chain links and the housing.

4. Means as claimed in claim 1, in which the guide means comprise radial guides provided on the housing and engaged by the pins of the pin-and-slot connections between the chain links.

JAN SKORECKI.

References Cited in the file of this patent

UNITED STATES PATENTS

| Number | Name | Date |
| --- | --- | --- |
| 591,067 | Wallace | Oct. 5, 1897 |
| 645,846 | Baxter | Mar. 20, 1900 |
| 1,120,535 | Pruden | Dec. 8, 1914 |
| 1,327,452 | Williams | Jan. 6, 1920 |
| 2,546,293 | Berliner | Mar. 27, 1951 |
| 2,603,060 | Brown | July 15, 1952 |
| 2,603,062 | Weiler et al. | July 15, 1952 |
| 2,608,820 | Berliner | Sept. 2, 1952 |